United States Patent
Wong et al.

(10) Patent No.: US 11,630,526 B2
(45) Date of Patent: *Apr. 18, 2023

(54) INPUT SYSTEM AND INPUT METHOD

(71) Applicant: Wacom Co., Ltd., Saitama (JP)

(72) Inventors: Henry Wong, Portland, OR (US);
Oliver Martin Madlener, Duesseldorf (DE); Moritz Arnt, Duesseldorf (DE)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,658

(22) Filed: Nov. 11, 2021

(65) Prior Publication Data

US 2022/0066579 A1    Mar. 3, 2022

Related U.S. Application Data

(63) Continuation of application No. 16/895,675, filed on Jun. 8, 2020, now Pat. No. 11,175,755.

(51) Int. Cl.
*G06F 3/0354* (2013.01)
*G06F 3/01* (2006.01)

(52) U.S. Cl.
CPC .......... *G06F 3/03545* (2013.01); *G06F 3/017* (2013.01)

(58) Field of Classification Search
CPC ...... G06F 3/03545; G06F 3/017; G06F 3/041; G06F 3/0416; G06F 3/016; G06F 2203/04102; G06F 2203/04103; G06F 2203/04104; G06F 2203/04106
USPC ....................................................... 345/179
See application file for complete search history.

(56) References Cited

U.S. PATENT DOCUMENTS

| | | | |
|---|---|---|---|
| 4,878,553 A | 11/1989 | Yamanami et al. | |
| 11,175,755 B1* | 11/2021 | Wong | G06F 3/017 |
| 2004/0238910 A1* | 12/2004 | Fujii | G06F 3/041 257/433 |
| 2006/0050059 A1 | 3/2006 | Satoh et al. | |
| 2006/0223346 A1* | 10/2006 | Fujii | G06F 3/041 439/76.2 |
| 2009/0284485 A1* | 11/2009 | Colgate | G06F 3/016 345/184 |
| 2010/0231367 A1* | 9/2010 | Cruz-Hernandez | G06F 3/0488 345/173 |
| 2012/0086668 A1* | 4/2012 | Wang | G06F 3/0446 178/18.05 |
| 2012/0313874 A1* | 12/2012 | Chappaz | G06F 3/016 29/25.35 |

(Continued)

*Primary Examiner* — Tom V Sheng
(74) *Attorney, Agent, or Firm* — Seed IP Law Group LLP

(57) ABSTRACT

An input system according to one aspect of the present disclosure comprises an electronic pen having a pen tip; and an electronic device configured to detect a pointed position of the electronic pen based on a detection signal received pursuant to an approach by the pen tip toward the electronic device. The electronic device includes: a planar sensor configured to acquire the detection signal; a flexible cover provided above the planar sensor and exposed to the outside; an actuator configured to displace the cover at each of multiple positions in an area defined by the planar sensor in at least a direction normal to the planar sensor; and a drive controller configured to perform drive control of the actuator so as to form local unevenness at a position of the cover corresponding to the pointed position of the electronic pen.

10 Claims, 7 Drawing Sheets

(56) References Cited

U.S. PATENT DOCUMENTS

| | | | |
|---|---|---|---|
| 2013/0201115 A1 | 8/2013 | Heubel | |
| 2013/0264179 A1* | 10/2013 | Ryonai | G06F 3/041 |
| | | | 200/269 |
| 2013/0307829 A1* | 11/2013 | Libin | G06F 3/016 |
| | | | 345/179 |
| 2014/0160064 A1 | 6/2014 | Yairi et al. | |
| 2014/0340318 A1* | 11/2014 | Stringer | G06F 3/044 |
| | | | 345/173 |
| 2015/0185879 A1 | 7/2015 | Aurongzeb et al. | |
| 2015/0193033 A1* | 7/2015 | Westhues | G06F 3/0441 |
| | | | 345/173 |
| 2016/0282970 A1* | 9/2016 | Evreinov | G06F 3/0383 |
| 2017/0153760 A1 | 6/2017 | Chawda et al. | |
| 2017/0285848 A1* | 10/2017 | Rosenberg | G06F 3/03547 |
| 2019/0339776 A1* | 11/2019 | Rosenberg | G06F 3/0416 |

\* cited by examiner

FIG.4
| Type of pen tip | Pattern |
|---|---|
| Type A | 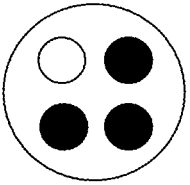 |
| Type B | 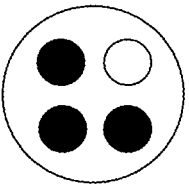 |
| Type C | 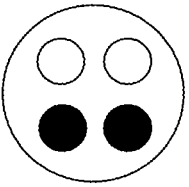 |
| Type D | 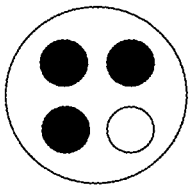 |

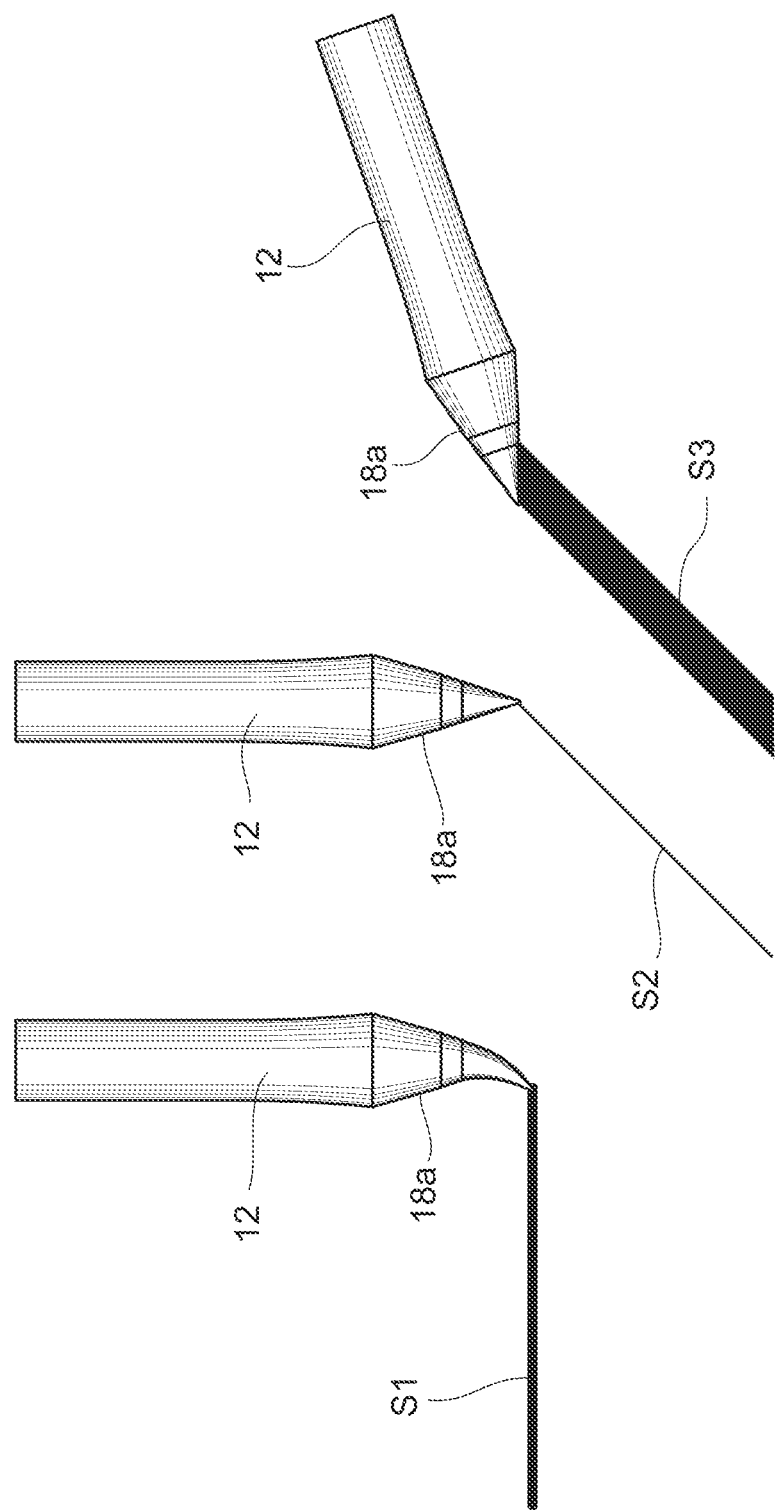

INPUT SYSTEM AND INPUT METHOD

BACKGROUND

Technical Field

The present disclosure relates to an input system and an input method.

Description of the Related Art

An input system is known, which includes an electronic pen, which may be a pen-type pointing device, and an electronic device including a touch sensor that detects a touch. A user can draw pictures and characters by holding the electronic pen with one hand and moving it (the electronic pen) while pressing its pen tip against the touch surface of the electronic device.

BRIEF SUMMARY

Technical Problem

The input system described above can be used, for example, in a situation where s designer wishes to verify or confirm a 3D design that he/she has created. However, displaying the original design or a changed design on a flat display surface may not be sufficient to allow the viewer to readily understand or imagine the three-dimensional shape of the design, which is displayed in two dimensions.

Solution to Problem

An input system according to one aspect of the present disclosure comprises an electronic pen having a pen tip; and an electronic device configured to detect a pointed position of the electronic pen based on a detection signal received pursuant to an approach by the pen tip toward the electronic device. The electronic device includes: a planar sensor configured to acquire the detection signal; a flexible cover provided above the planar sensor and exposed to the outside; an actuator configured to displace the cover at each of multiple positions within an area formed by the planar sensor in at least a direction normal to the planar sensor; and a drive controller configured to perform drive control of the actuator so as to form local unevenness at a position of the cover corresponding to the pointed position of the electronic pen.

An input method according to another aspect of the present disclosure uses an input system, which comprises an electronic pen having a pen tip; and an electronic device configured to detect a pointed position of the electronic pen based on a detection signal received pursuant to an approach by the pen tip toward the electronic device. The electronic device includes: a planar sensor configured to acquire the detection signal; and a flexible cover provided above the planar sensor and exposed to the outside. The input method includes: detecting a pointed position of the electronic pen based on a detection signal received pursuant to an approach by the pen tip toward the planar sensor; and displacing the cover in at least a direction normal to the planar sensor to form local unevenness at a position of the cover corresponding to the pointed position of the electronic pen.

Advantageous Effects

According to the present disclosure, the cooperative operation of the electronic pen and the electronic device achieves three-dimensional representations of designs that are created in two dimensions.

BRIEF DESCRIPTION OF THE SEVERAL VIEWS OF THE DRAWINGS

FIG. 4 shows sample corresponding relationships between pen tip types and connection patterns.

FIG. 6 shows relationships between a writing state of the electronic pen and a line width of a stroke.

DETAILED DESCRIPTION

The input system and the input method according to the present disclosure will be described with reference to the drawings. It should be noted that the present disclosure is not limited to the embodiments described below, and can be readily modified based on the present disclosure. Alternatively or additionally, the configurations and components of the embodiments may be readily combined based on the present disclosure.

Configuration of Input System 10

Figure 1:
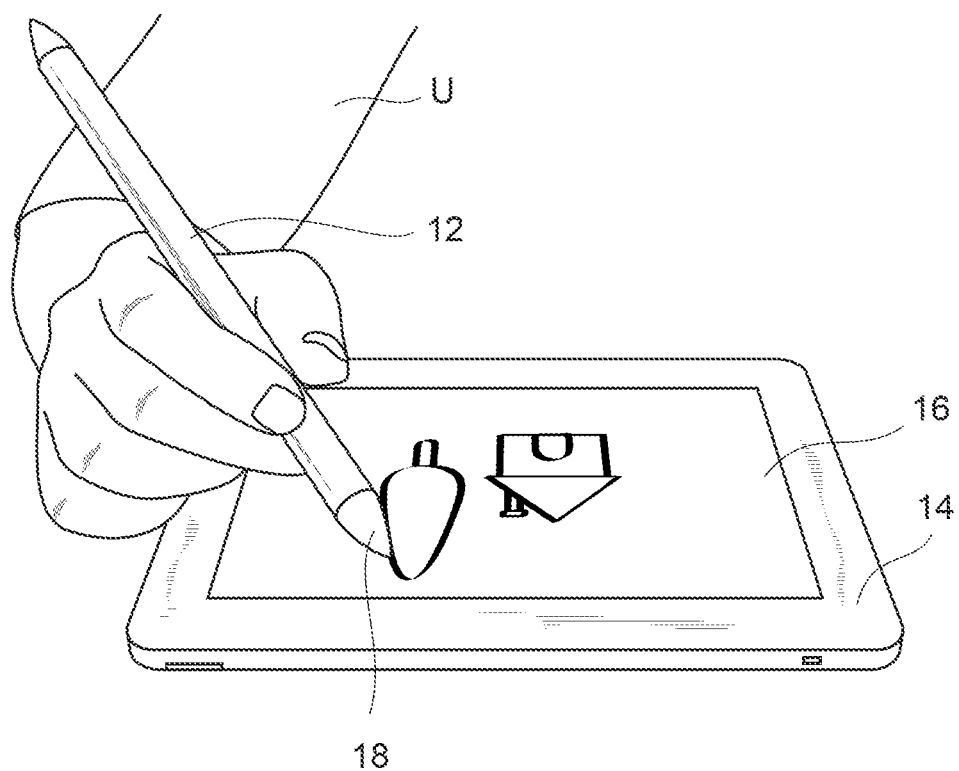
FIG. 1 is an overall configuration diagram of an input system according to an embodiment of the present disclosure.

FIG. 1 is an overall configuration diagram of an input system 10 according to an embodiment of the present disclosure. The input system 10 generally includes an electronic pen 12, which is a pen-type pointing device, and an electronic device 14 used with the electronic pen 12.

The electronic pen 12 is configured to be able to communicate with the electronic device 14 in one direction or two directions. The electronic pen 12 in the illustrated embodiment is an electromagnetic resonance/induction type (EMR) stylus, but may be an active electrostatic coupling type (AES) stylus, for example.

The electronic device 14 may be, for example, a tablet terminal, a smartphone, a personal computer, and so forth. The user U can draw pictures and characters, and can also perform three-dimensional engraving by holding the electronic pen 12 with one hand and moving the electronic pen 12 while pressing the pen tip 18 against the touch surface 16 of the electronic device 14.

Figure 2:
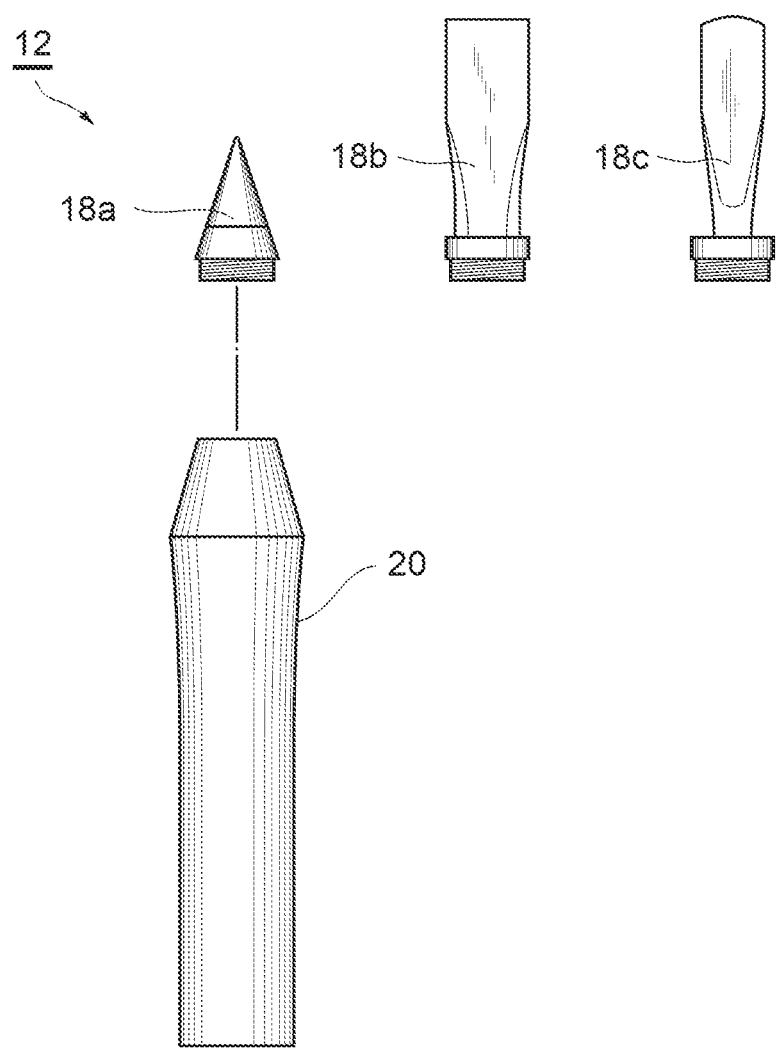
FIG. 2 is an exploded view of the electronic pen shown in FIG. 1 as viewed from the front.

FIG. 2 is an exploded view of the electronic pen 12 shown in FIG. 1 as viewed from the front. In FIG. 2, three types of nibs 18a, 18b, 18c having different shapes are shown. Note that the shapes and the number of types of the pen tip 18 are not limited to the illustrated examples.

The pen tip 18a has a shape resembling the tip of a brush pen. The pen tip 18b has a shape resembling the tip of a chisel having a relatively wide blade. The pen tip 18c has a shape resembling the tip of a chisel having a relatively narrow blade. The pen tips 18a, 18b, 18c are respectively provided detachably with respect to the pen body 20 of the electronic pen 12.

Figure 3:
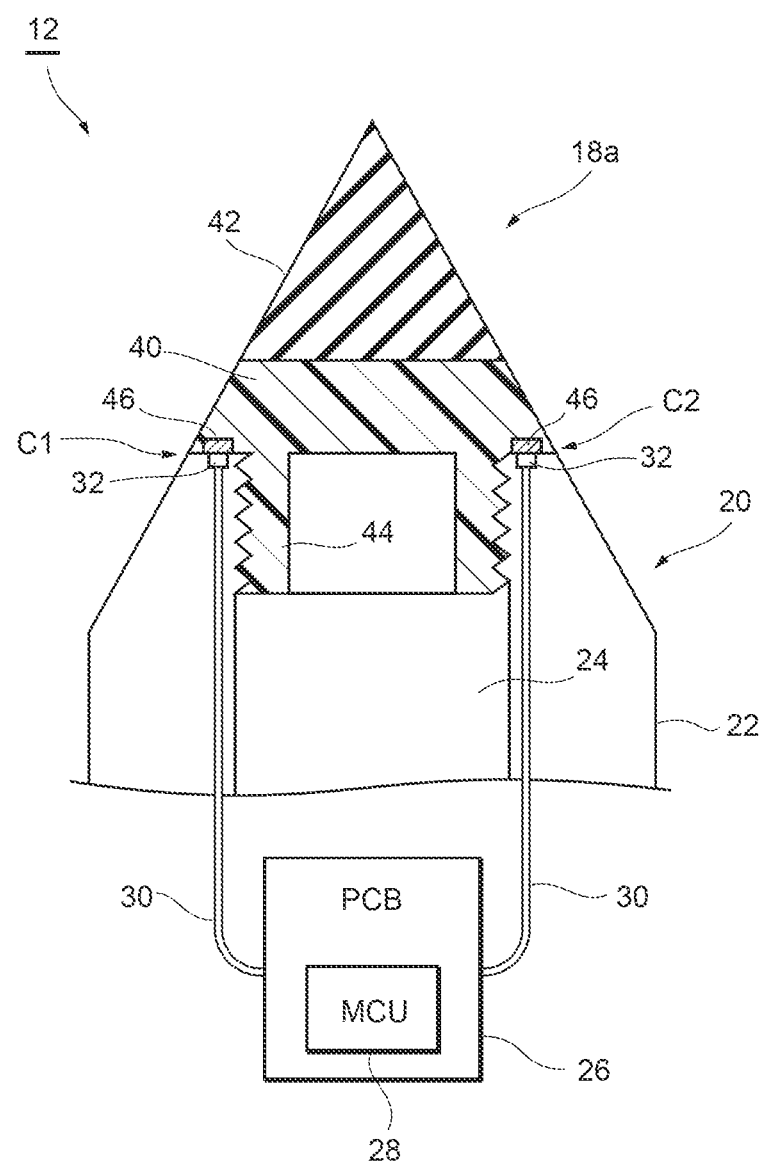
FIG. 3 is a schematic cross-sectional view around the tip of the electronic pen shown in FIGS. 1 and 2.

FIG. 3 is a schematic cross-sectional view around the tip of the electronic pen 12 shown in FIGS. 1 and 2. FIG. 3 illustrates a partial cross-sectional structure of the electronic pen 12, on which a pen tip 18a resembling a brush pen, as an example, is mounted. The pen body 20 includes a hollow rod-shaped housing 22 and a printed circuit board (hereinafter, PCB 26) housed in an internal space 24 defined by the housing 22. Although not shown, the internal space 24 may further include a coil for generating electromagnetic induction, an axial shaft having one end fixed to the pen tip 18, a pen pressure sensor provided at the other end of the axial shaft for detecting a pen pressure applied to the pen tip 18 and transmitted via the axial shaft, and so forth.

A microcontroller unit (hereinafter, MCU 28) that performs various controls related to the operation of the electronic pen 12 is mounted on the PCB 26. Also, two pairs of electric wire 30 are electrically connected to terminals (not shown) of the PCB 26. At the end of each pair of electric wire 30, a connector 32 is provided. Each of the connectors 32 is arranged so as to be exposed to the outside at the distal end surface of the housing 22.

The pen tip 18a includes a base portion 40, a tip portion 42 provided on the upper side of the base portion 40, and a joint portion 44 provided on the lower side of the base portion 40, as shown in FIG. 3. The base portion 40 is a frustoconical member made of an insulating material such as resin, and molded integrally with the joint portion 44. The distal end portion 42 is made of an elastic material such as rubber, and is a conical member that comes into contact with the touch surface 16 (FIG. 1) of the electronic device 14 when the user performs a drawing or writing operation. The joint portion 44 is a cylindrical member that can be fastened to the inner wall of the housing 22 near its distal end via screw threads, for example.

Two conductive members 46 are embedded in the lower surface of the base portion 40 and at positions radially outside the joint portion 44. Each conductive member 46 is arranged so as to be connectable to one of the two connectors 32 provided on the housing 22. With respect to the pair of electric wire 30 on the left in FIG. 3, the end of each wire is connected with each other to form a closed loop passing through the connection point C1. With respect to the pair of electric wire 30 on the right, the end of each wire is connected with each other to form a closed loop passing through the connection point C2. In this manner, when the pen tip 18a is mounted to the pen body 20, the pen tip 18a and the pen body 20 are electrically connectable at the two connection points C1 and C2.

While the structure of one type of the pen tip 18a has been described, other types of pen tips 18b and 18c may be understood to have similar configurations as the pen tip 18a. However, in various embodiments, different types of the pen tip 18 may have different arrangements of the conductive members 46, i.e., different connection patterns between the pen tip 18 and the pen body 20.

FIG. 4 shows sample corresponding relationships between pen tip types and connection patterns of the conductive members 46. The schematic diagram in the right column of FIG. 4 shows the arrangement of the conductive members 46. Specifically, a black (filled) circle indicates that the conductive member 46 is provided at that position. On the other hand, a white (un-filled) circle indicates that the conductive member 46 is not provided at that position. The maximum number of the conductive members 46 is illustrated to be four in FIG. 4, though is not limited to four, and instead may be two, three, or five or more.

In type A, three conductive members 46 are provided except at the upper left position. In type B, three conductive members 46 are provided except at the upper right position. In type C, two lower conductive members 46 are provided. In type D, three conductive members 46 are provided except at the lower right position. A case where the pen tip 18 is not attached to the pen body 20 corresponds to the case where no conductive member 46 is provided.

Therefore, the MCU 28 of the pen body 20 may recognize the type of the pen tip 18 based on the electrical connection state with the pen tip 18. Specifically, when the maximum number of the conductive members 46 is four as illustrated, there are sixteen (16) possible combinations of the electrical connection states (connected or not connected) between the four conductive members 46 and the four pairs of electric wire 30. The MCU 28 may detect one of the sixteen possible combinations of the connection states as a 4-bit code value, to thereby recognize the type of the pen tip 18 associated with the 4-bit code value.

Figure 5:
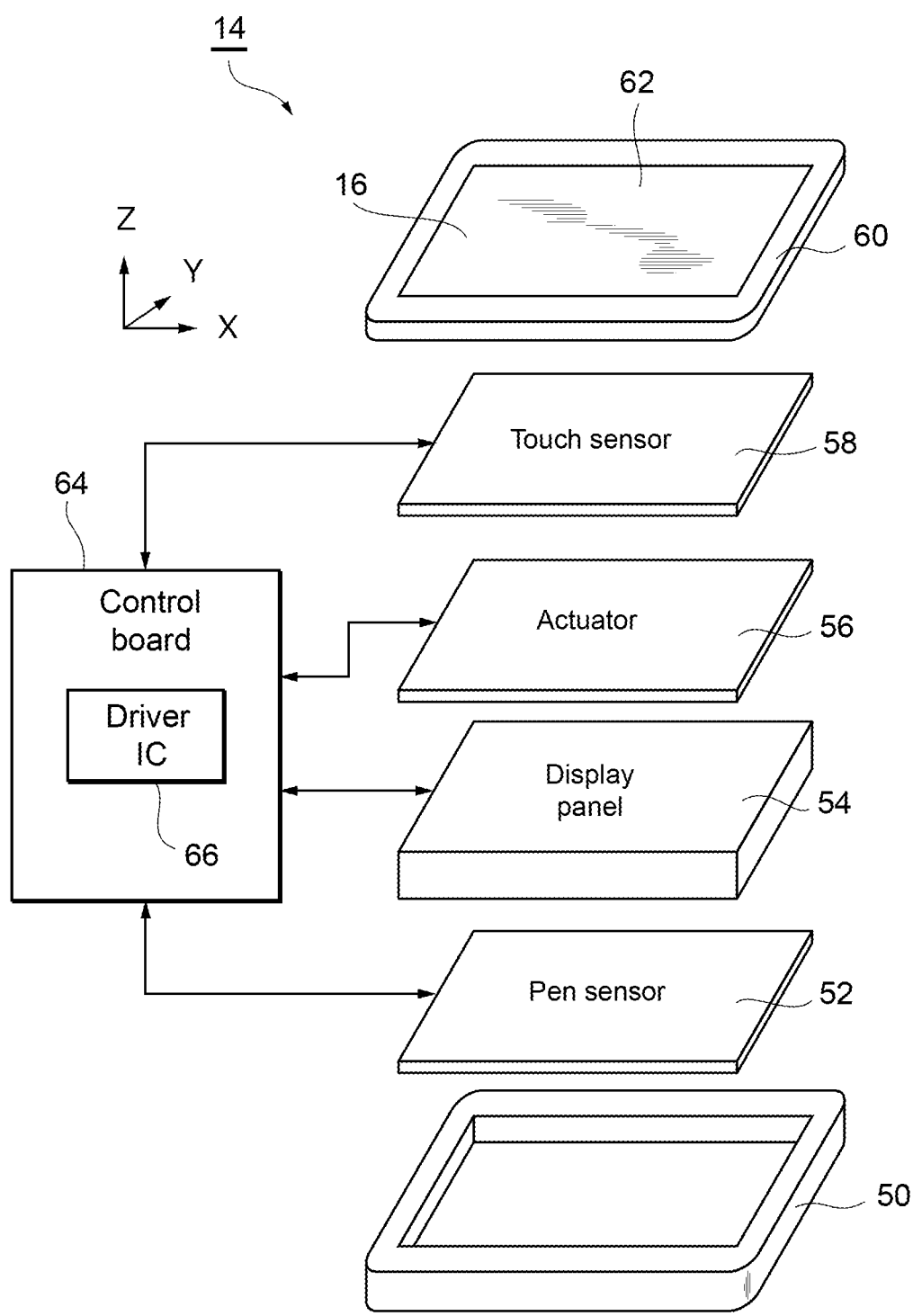
FIG. 5 is an exploded perspective view of the electronic apparatus shown in FIG. 1.

FIG. 5 is an exploded perspective view of the electronic device 14 shown in FIG. 1. The electronic device 14 includes a back cover 50, a pen sensor 52 (e.g., a "planar sensor"), a display panel 54, an actuator 56, a touch sensor 58 (e.g., also a "planar sensor"), and a front cover 60, which may be stacked together in this order from the back side toward the front side to form the electronic device 14.

The back cover 50 and the front cover 60 are members that form a housing for the electronic components of the electronic device 14. The front cover 60 includes a covering surface (or a cover) 62 which covers the entire opening formed by a surrounding frame of the front cover 60. The cover 62 may be made of, for example, a highly flexible and light-transmitting material such as a resin material.

The pen sensor 52 is a flat sensor that acquires a detection signal related to the electronic pen 12 using electromagnetic induction, for example. When the electronic pen 12 is an AES stylus, the touch sensor 58 can perform the function of detecting the electronic pen 12 in addition to performing the function of detecting a finger touch and, thus, the pen sensor 52 can be omitted.

The display panel 54 may be formed of, for example, a liquid crystal panel, an organic EL (Electro Luminescence) panel, electronic paper, and the like. The display panel 54 displays an image or video in its display area by applying driving voltages to matrix signal lines arranged in a row direction and a column direction (not shown) to drive a plurality of pixels.

The actuator 56 is arranged over the display surface (XY plane) of the display panel 54, and is configured to be displaceable at least in the normal direction (Z direction) at multiple positions. For example, the actuator 56 may be a linear actuator array, in which linear actuators are two-dimensionally arranged (e.g., as a matrix). Alternatively, the actuator 56 may be an "origami" type actuator configured such that a plurality of polygon components are tightly arranged without gaps in-between and connected to form a sheet, wherein the connection portions between the polygon components may be driven to bend the sheet into a variety of shapes.

The touch sensor 58 may be an "external type" sensor that is attached to the display panel 54 from the outside, or may be an "internal type" that is integrally formed with the display panel 54 (e.g., an on-cell type sensor or an in-cell type sensor).

A control board 64 forming electric circuitry for operating the electronic device 14 is provided inside the electronic device 14. On the control board 64, a host processor, a memory, a wireless communication module, a power supply circuit, and various control ICs (Integrated Circuits) may be provided. The control IC in the illustrated example is an integrated circuit for the pen sensor 52, the display panel 54, the actuator 56, and the touch sensor 58. In the illustrated example, only a drive IC 66 (e.g., a drive controller) configured to controllably drive the actuator 56 is shown.

Operation of Input System 10

Next, the operation of the input system 10 will be described with reference to FIGS. 6 to 7B. First, the user attaches or mounts a desired type of the pen tip 18 to the pen body 20. The MCU 28 of the pen body 20 may recognize the type of the attached pen tip 18 by detecting the conduction states (or connection states) of the pairs of electric wire 30. Thereafter, the electronic device 14 obtains a detection signal, which includes information about the type of the pen tip 18, from the pen sensor 52 to which the electronic pen 12 approaches, and switches to the drawing mode corresponding to the detected type of the pen tip 18. For example, the "brush pen mode" may be selected when the pen tip type 18a is detected, and the "chisel mode" may be selected when the pen tip types 18b and 18c are detected.

When the brush pen type pen tip 18a is used, the electronic device 14 executes the brush pen mode to reproduce a stroke resembling an actual brush pen stroke. Specifically, the electronic device 14 generates digital ink (or ink data) having a line width that varies according to the pen pressure and/or the inclination angle of the electronic pen 12, and renders (displays) the digital ink on the display panel 54.

FIG. 6 shows the relationships between the writing state of the electronic pen 12 and the line width of the stroke. For example, when the electronic pen 12 is held perpendicular to the touch surface 16, a stroke S1 having a greater line width is formed because the pen pressure is greater, and a stroke S2 having a smaller line width is formed because the pen pressure is lower. When the electronic pen 12 is inclined with respect to the touch surface 16, a stroke S1 having a smaller line width may be formed when the inclination angle (relative to the normal direction) is smaller, and a stroke S3 having a greater line width may be formed when the inclination angle (relative to the normal direction) is larger.

When the chisel type pen tip 18b or 18c is used, the electronic device 14 executes the chisel mode to reproduces a stroke resembling an actual carving made by a chisel. Specifically, the electronic device 14 may form local unevenness on the touch surface 16 by driving the actuator 56 according to the position indicated by the electronic pen 12.

Figure 7A:
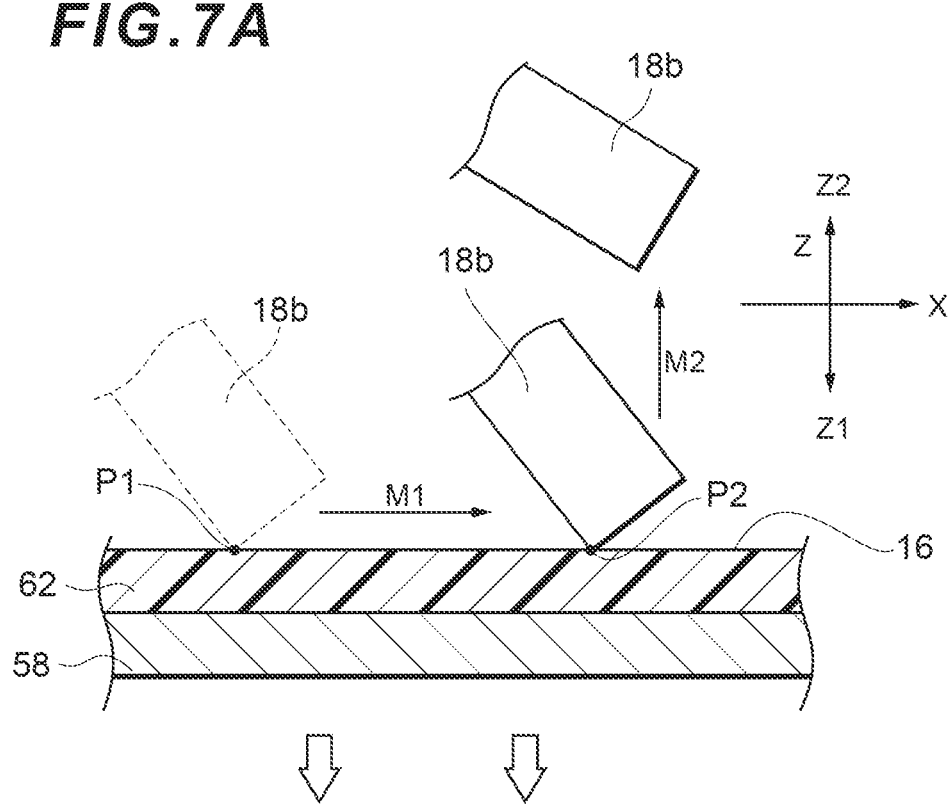
FIG. 7A is a diagram illustrating a three-dimensional shape of the touch surface during execution of a stroke operation.

FIG. 7A is a diagram illustrating a three-dimensional shape of the touch surface 16 during execution of a stroke operation. It is assumed that the touch surface 16 of the electronic device 14 is flat before the stroke operation is performed. After performing the pen-down operation at position P1 on the touch surface 16, the user continuously and sequentially moves the electronic pen 12 along the M1 direction and then along the M2 direction, as shown. When the pen-up operation is detected at position P2 (when the electronic pen 12 is lifted from the touch surface 16), the drive IC 66 may controllably drive the actuator 56 so as to form unevenness at positions along the stroke from position P1 to position P2.

Figure 7B:
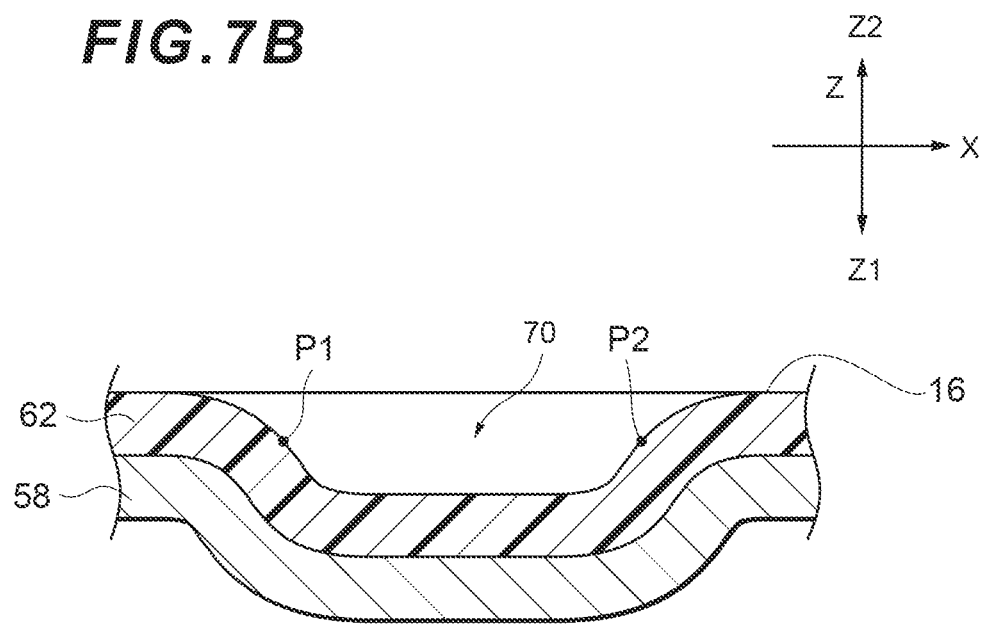
FIG. 7B is a diagram illustrating a three-dimensional shape of the touch surface after the execution of the stroke operation of FIG. 7A.

FIG. 7B is a diagram illustrating the three-dimensional shape of the touch surface 16 after the execution of the stroke operation of FIG. 7A. When a portion (or a position) of the actuator 56 is displaced downward (Z1 direction), the touch sensor 58 and the cover 62 integrally move downward and, as a result, a concave groove 70 is formed at positions of the stroke between positions P1 and P2. In this way, by repeatedly performing the stroke operation of the electronic pen 12 and the driving operation of the actuator 56, various three-dimensional sculptures may be formed by the electronic device 14.

The drive IC 66 may controllably drive the actuator 56 so that the amount of displacement is different depending on the type of the pen tip 18. In various embodiments, even if the stroke is the same, different types of the pen tip 18 may be used to create different types of the concave groove 70 in which at least one of the width, the depth, the shape, etc., of the concave groove is different. Thus, rich expression of three-dimensional sculpture becomes possible. The drive IC 66 may controllably drive the actuator 56 so as to deform the touch surface 16 not only into a concave shape but also into a convex shape.

As described above, the input system 10 may be formed of the electronic pen 12 having the pen tip 18, and the electronic device 14 configured to detect a pointed position of the electronic pen 12 based on a detection signal received pursuant to an approach by the pen tip 18 toward the planar pen sensor (e.g., the pen sensor 52, or the touch sensor 58 in case of an AES stylus). In various embodiments, the electronic device 14 includes the planar pen sensor 52 configured to acquire the detection signal, the flexible cover 62 provided above the planar pen sensor 52 and exposed to the outside, and the actuator 56 configured to displace the cover 62 at each of multiple positions in an area formed (defined) by the planar pen sensor 52 in at least a direction normal to the pen sensor 52. The electronic device 14 further includes the drive IC 66 configured to perform drive control of the actuator 56 so as to form local unevenness at positions of the cover 62 corresponding to the pointed positions of the electronic pen 12. Accordingly, the cooperative operation of the electronic pen 12 and the electronic device 14 achieve three-dimensional expressions or representations of designs that are created in two dimensions.

When the drive IC 66 detects a stroke operation to form a stroke based on movement of the electronic pen 12 with the pen tip 18 in contact with the cover 62, the drive IC 66 may create unevenness (for example, the concave groove 70 of FIG. 7B) at positions along the stroke, simultaneously as the stoke is being drawn for example. Alternatively, the drive control of the actuator 56 may be performed so as to create unevenness at positions along the stroke after detecting the pen-up operation following the stroke operation. When the electronic pen 12 is configured so that different types of the pen tip 18 can be attached to and detached from the pen body 20, the drive IC 66 may control the drive of the actuator 56 so that the displacement varies depending on the type of the pen tip 18.

When the electronic pen 12 is configured so that the pen tip 18 and the pen body 20 can be electrically connected to each other when the pen tip 18 is mounted to the pen body 20, the MCU 28 of the pen body 20 may be able to recognize the type of the mounted pen tip 18 based on the electrical connection state between the pen body 20 and the pen tip 18. When the pen body 20 is configured to be electrically connectable to the pen tip 18 at a plurality of connection points C1 and C2 (see FIG. 3), the MCU 28 of the pen body 20 may determine the number or arrangement of the connection points C1 and C2 to thereby recognize the type of the pen tip 18.

The invention claimed is:

1. An input system, comprising:
an electronic pen having a pen tip; and an electronic device configured to detect a pointed position of the electronic pen based on a detection signal received pursuant to an approach by the pen tip toward the electronic device, wherein the electronic device includes:
- a planar sensor configured to acquire the detection signal;
- a flexible cover provided above the planar sensor and exposed to the outside;
- an actuator configured to displace the cover at each of multiple positions in an area defined by the planar sensor in at least a direction normal to the planar sensor; and
- a drive controller configured to perform drive control of the actuator so as to form local unevenness at a position of the cover corresponding to the pointed position of the electronic pen, wherein the electronic pen is configured so that the pen tip is detachable from a pen body of the electronic pen, and the drive controller performs drive control of the actuator so that a characteristic of the displacement varies depending on a type of the pen tip.

2. The input system according to claim 1, wherein the drive controller performs drive control of the actuator in response to detecting a stroke operation that forms a stroke based on movement of the electronic pen in a state where the pen tip is in contact with the cover, so as to form local unevenness at positions along the stroke.

3. The input system according to claim 2, wherein the stroke operation is detected by detecting a pen-up operation following a stroke operation.

4. The input system according to claim 1, wherein the electronic pen is configured such that the pen tip and the pen body are electrically connectable to each other when the pen tip is mounted to the pen body, and the pen body is configured to recognize the type of the pen tip based on an electrical connection state between the pen body and the pen tip.

5. The input system according to claim 4, wherein the pen body is configured to be electrically connectable to the pen tip at a plurality of connection points, and is configured to recognize the type of the pen tip based on a number or arrangement of the connection points.

6. An input method using an input system,
wherein the input system includes:
- an electronic pen having a pen tip; and
- an electronic device configured to detect a pointed position of the electronic pen based on a detection signal;

wherein the electronic device includes:
- a planar sensor configured to acquire the detection signal; and
- a flexible cover provided above the planar sensor and exposed to the outside; and wherein the input method comprises:
detecting a pointed position of the electronic pen based on a detection signal received pursuant to an approach by the pen tip toward the planar sensor; and
displacing the cover in at least a direction normal to the planar sensor to form local unevenness at a position of the cover corresponding to the pointed position of the electronic pen, wherein the electronic pen is configured so that the pen tip is detachable from a pen body of the electronic pen, and the step of displacing the cover includes varying a characteristic of the displacement depending on a type of the pen tip.

7. The input method according to claim 6, which comprises:
displacing the cover in response to detecting a stroke operation that forms a stroke based on movement of the electronic pen in a state where the pen tip is in contact with the cover, so as to form local unevenness at positions along the stroke.

8. The input method according to claim 7, wherein the stoke operation is detected by detecting a pen-up operation following the stroke operation.

9. The input method according to claim 6, wherein the electronic pen is configured such that the pen tip and the pen body are electrically connectable to each other when the pen tip is mounted to the pen body, and the pen body is configured to recognize the type of the pen tip based on an electrical connection state between the pen body and the pen tip.

10. The input method according to claim 9, wherein the pen body is configured to be electrically connectable to the pen tip at a plurality of connection points, and is configured to recognize the type of the pen tip based on a number or arrangement of the connection points.

\* \* \* \* \*